United States Patent

[11] 3,588,694

| [72] | Inventors | Svyatoslav Anatolievich Kravchenko<br>Kirovsky prospekt, 65, KV.29;<br>Evgeny Dmitrievich Koltik, B.<br>Porokhovskayaul, 54, Korp. 2, KV.77,<br>Leningrad, U.S.S.R. |
|------|-----------|---|
| [21] | Appl. No. | 771,806 |
| [22] | Filed | Oct. 30, 1968 |
| [45] | Patented | June 28, 1971 |

[54] VERY-LOW AND LOW-FREQUENCY PRECISION PHASE CALIBRATOR
3 Claims, 3 Drawing Figs.

[52] U.S. Cl. .................................................. 324/85
[51] Int. Cl. .................................................. G01r 25/00
[50] Field of Search ................................... 324/83 (A), 85

[56] References Cited
UNITED STATES PATENTS

| 2,595,263 | 5/1952 | Ingalls | 324/85 |
| 3,227,949 | 1/1966 | Oberbeck | 324/85UX |

*Primary Examiner*—Alfred E. Smith
*Attorney*—Waters, Roditi and Schwartz

ABSTRACT: A precision phase calibrator including a master oscillator supplying a variable-phase and a reference-phase network and a phase shifter connected to the input of a frequency divider in the variable-phase network and coupled to the master oscillator. A phase angle measuring circuit is connected in parallel with the phase shifter and contains two mixers, one of the inputs of which is connected to the phase shifter, while the other mixer has one of its inputs connected to the master oscillator. These mixers operate at a frequency coherent with that of the master oscillator, and the phase-angle meter is connected to the outputs of the mixers.

VERY-LOW AND LOW-FREQUENCY PRECISION PHASE CALIBRATOR

The present invention relates to measuring instruments. More specifically, the present invention relates to precision phase calibrators.

In known arrangements, a precision phase calibrator for infrasonic, sonic, and very low frequencies comprises a master oscillator feeding a variable-phase and a reference-phase network of series-connected frequency dividers and attenuators, and a phase shifter connected to the input of the frequency divider in the variable-phase network and coupled to the master oscillator.

A drawback of known precision phase calibrators is the low accuracy with which the desired phase relationship can be maintained.

An object of this invention is to provide a precision phase calibrator which is capable of maintaining the desired phase relationship with a high degree of accuracy.

The invention consists in that in a precision phase calibrator comprising a master oscillator which feeds a variable-phase and a reference-phase network and a phase shifter connected to the input of the frequency divider in the variable-phase network and coupled to the master oscillator, there is provided, according to the invention, a phase-angle measuring circuit connected in parallel with the phase shifter and containing two mixers one of the inputs of which is connnected to the phase shifter and the other of the inputs to the master oscillator and which operate at a frequency coherent with that of the said master oscillator and the phase-angle meter connected to the outputs of the mixers.

The invention will be best understood from the following description of a specific embodiment when read in connection with the accompanying drawings, in which.

Figure 2:
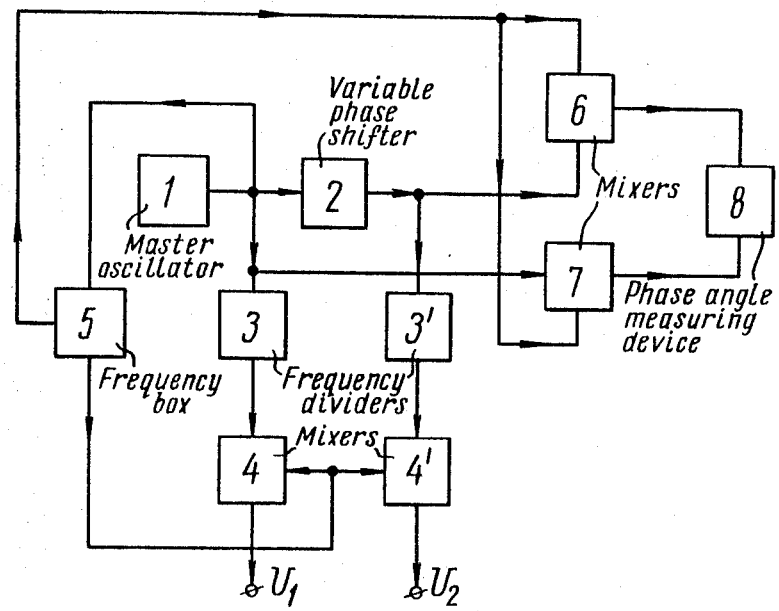
FIG. 2 is a block diagram of the preferred embodiment of the invention.
Figure 1:
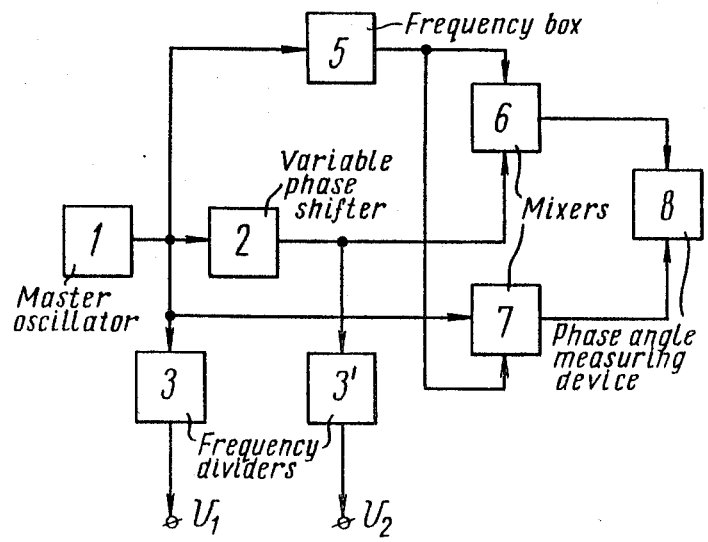
FIG. 1 is a block diagram of the phase calibrator according to the present invention.

Referring now to the drawings and to FIG. 1 in particular, the precision phase calibrator incorporates a master oscillator 1 which feeds a variable-phase and a constant-phase network, and a phase shifter 2 coupled to the master oscillator 1. The variable-phase network and the constant-phase network each incorporate a frequency divider 3 (3'). The phase shifter 2 is connected to the input of the frequency divider 3' in the variable-phase network.

The calibrator incorporates a phase-angle measuring circuit which comprises two mixers 6 and 7 operating at frequencies coherent with those of the master oscillator 1. The input of the mixer 6 is connected to the output terminal of the phase shifter 2, and the input of mixer 7 is connected to the master oscillator 1. The outputs of the mixers 6 and 7 are connected to a phase-angle meter 8. In the preferred embodiment of this invention (which also carries out our other invention described in our copending Application Ser. No. 750,139 filed Aug. 5, 1968) each of the said networks 4 (4'). One input of each mixer is connected to master oscillator 1 through frequency box 5. The frequency box 5 delivers a spectrum of coherent frequencies in steps equal to the lowest value of infrasonic frequency.

The following description will be concerned with operation of the phase calibrator in the frequency range from 0.01 c/s to 9.99999 kc.

Figure 3:
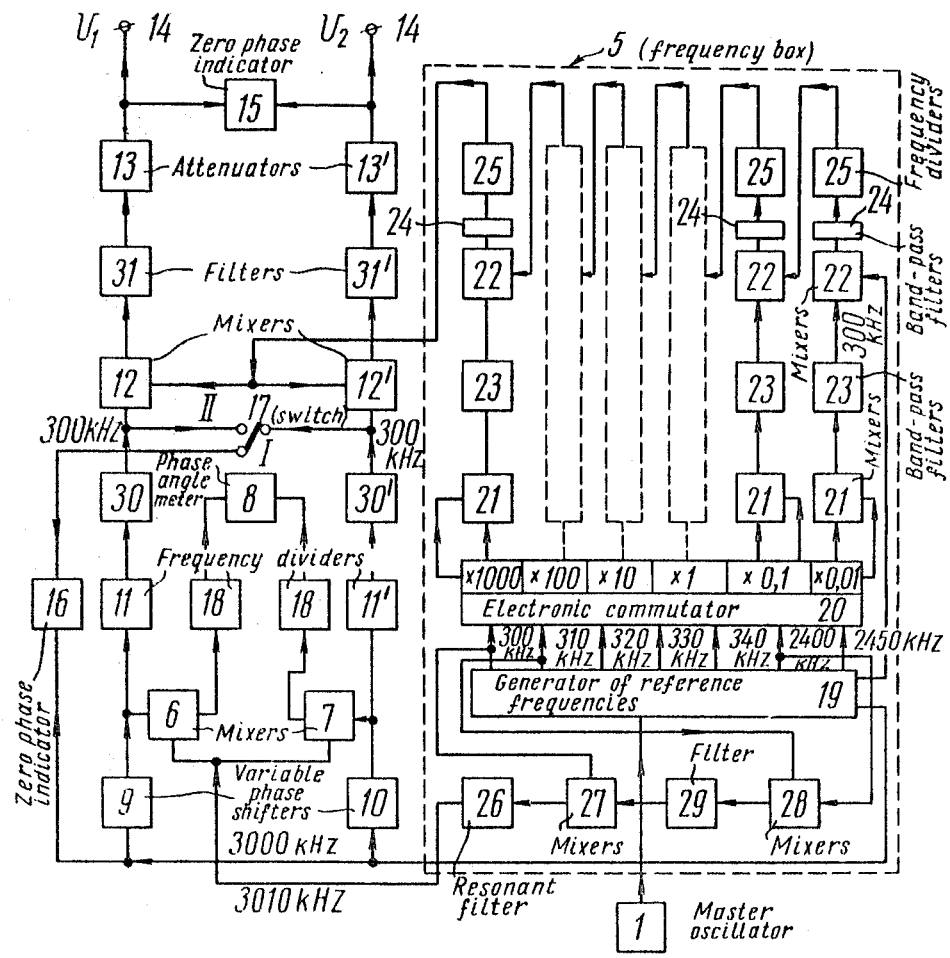
FIG. 3 is a detailed circuit diagram of the embodiment shown in FIG. 2.

FIG. 3 is a detailed functional diagram of the preferred embodiment of the proposed phase calibrator. The frequency box 5 is connected to a main and an auxiliary phase shifter 9 and 10 respectively. The variable-phase and the reference-phase networks contain frequency dividers 11 and 11' and mixers 12 and 12' arranged in series. The common input of the mixers 12 and 12' is connected to the output of the frequency box 5. There are attenuators 13 and 13' to control the output voltages. Between output terminals 14 is connected a zero phase-angle indicator 15 to assist with setting a zero phase shift adjustment by means of the main phase shifter 9. Indicator 15 may preferably be of the type described in the copending Applications Ser. Nos. 738,869 and 772,530 filed by the first applicant of the present application on June 21, 1968 and Nov. 1, 1968, respectively. Another zero phase shift indicator 16 is connected between the common inputs of the phase shifters 9 and 10 and a switch 17 by which the said zero phase shift indicator can be connected to the output of the frequency divider 11 or 11' selectively at will. It is worth mentioning that the indicator 16 is adapted to show the zero phase shift between two signals of different frequencies, the frequency ratio being an integer. Such signals are referred to as having zero phase shift if the instantaneous zero value of a lower frequency implies the instantaneous zero value of the signal of a higher frequency.

The mixers 6 and 7 are connected to the output of the frequency box 5 and are coupled to the phase-angle meter 8 via dividers 18.

The frequency box 5 incorporates a reference frequencies generator 19 connected to the master oscillator 1, an electronic commutator 20 and commutator-selected decade frequency changers with which the desired frequency is obtained. Each frequency changer comprises mixers 21 and 22, band-pass filters 23 and 24, and a frequency divider 25.

The mixers 6 and 7 of the phase-angle measuring circuit are connected to a resonant filter 26 coupled to a mixer 27. The latter is connected to the reference frequencies generator 19 via a mixer 28 and a filter 29.

The operation of the phase calibrator is as described below.

The master oscillator 1 feeds a 1-Mc. voltage signal to the reference frequencies generator 19 which produces five so-called reference frequencies, two auxiliary frequencies 2400 and 2450 kc., and also a signal of frequency 3000 kc. at which the phase shifters operate. The reference frequencies are 300, 310, 320, 330 and 340 kc., which are spaced 10 kc. apart. The reference frequencies are coherent, since they are derived from the same master oscillator 1. Signals at the auxiliary frequencies 2400 and 2450 kc. and also the reference frequencies are fed to the electronic commutator 20. The commutator feeds the reference and auxiliary frequencies to the inputs of the summing mixers 21 and then to the band-pass filters 23 having a pass band from 2700 to 2790 kc. The filters 24 have a pass band from 3000 to 3090 kc. The electronic commutator 20 can feed two frequencies to each frequency changer simultaneously, one of the two auxiliary frequencies and one of the five reference frequencies. The frequency changers of the frequency box 5 generate signal voltages in the frequency range from 300 to 309.99999 kc. with a minimum spacing of 0.01 c/s. The frequency spacing varies from changer to changer and is marked on the commutator 20 by factors or multipliers from "X0.01" to "X100."

To obtain a deeper insight in the operation of the frequency box 5, consider frequency division with reference to the first (rightmost) changer, that is, the decade labeled "X0.01 c/s." Assume that all the five reference frequencies 300—340 kc. can be fed consecutively to the summing mixer 21 along with one and the same auxiliary frequency 2400 kc. Upon summation thereof, the output of the mixer 21 contains frequencies from 2700 to 2740 kc. spaced 10 kc. apart. When the second auxiliary frequency of 2450 kc. and the same reference frequencies are fed, the mixer 21 delivers additional frequencies from 2750 to 2790 kc., also spaced 10 kc. apart. The band-pass filter 23 has a pass band of 100 kc. with a center frequency of 2750 kg. Thus, it will transmit frequencies from 2700 to 2790 kc. in steps of 10 kc. In the summing mixer 22 these frequencies are combined with the fixed frequency of 300-kc. fed from the reference oscillator 19. The band-pass filter 24 has a pass band from 3000 to 3090 kc. The signals emerging from the frequency divider 25 lie in the frequency range from 300 to 309 kc. spaced 1 kc. apart. As the signals from the outputs of the frequency dividers 25 in the remaining decades are fed to the summing mixer 22 of the next frequency changer, they remain at the same frequency of 300 kc., but the frequency separation progressively decreases in each changer by a factor of ten. At the output of the frequency mixer 22 labeled X1000 the signals lie in the range of coherent frequencies from 300 to 309.99999 kc., or more accurately, from 300.00001 to 309.99999 kc. in steps of 0.01 c/s.

The 3010-kc. signal is produced as follows: The summing mixer 28 is fed with frequencies 310 kc. and 2400 kc. from the reference oscillator 19. The filter 29 transmits the 2700-kc. signal. Then signals at 2710 and 300 kc. are fed to the summing mixer 27 whose output is coupled to a resonant filter 26 which transmits the 3010-kc. signal. The 3000-kc. signal from the reference oscillator 19 is applied to the phase shifters 9 and 10. From the output of the said phase shifters the signals are fed simultaneously to the mixers 7 and the frequency (phase) dividers 11 and 11'. In order to enhance the accuracy of phase-angle measurements, the 3000-kc. signal at the output of the phase shifters is converted to a lower fixed frequency, say 10 kc., by the mixers 7. For this purpose, the said mixers are fed with a 3010-kc. voltage from the frequency box 5. Thus the mixers 7 accept constant-phase signals at 3010 kc. and a variable phase signals at 300 kc. The outputs of these mixers are coupled to low-pass filters 18 which transmit the useful 10-kc. signal. This signal is fed to the phase-angle meter 8 which measures the phase angle accurate to within $\pm 1°$. Since frequency conversions leave the phase relationships unaffected, the phase-angle meter 8 measures the phase shift existing at the outputs of the phase shifters 9 and 10. The phase shift may be measured by any phase-angle meter whose accuracy at 10 kc./s is withing $\pm 1°$. Connection of the frequency (phase) divider 11 and 11' with, say, a 1:10 division factor, past the phase shifters 9 and 10 will reduce the phase-angle error to one-tenth. At the same time the phase shift will also be reduced to one-tenth. Sinewave signals are selected after frequency division by low-pass filters 30. In order to obtain output signals $V_1$ and $V_2$ with frequencies from 0.01 c/s to 10 kc., or more precisely, to 9.99999 kc., the variable-phase voltages taken from the outputs of the filters 30 are applied to the mixers 12 and 12'. The other inputs of the said mixers are fed by the frequency box 5 with signals whose frequency is variable from 300.00001 to 309.99999 kc. The low-pass filters 31 attenuate all frequencies above 50 kc. and transmit the useful signals with frequencies from 0.01 to 9999.99 c/s. The output voltages can be adjusted by means of the attenuators 13 and 13'. Connected between the output terminals 14 is the zero phase shift indicator 15 to assist with setting the zero phase shift in adjustment by means of the auxiliary phase shifter 9. The other zero phase shift indicator 16 is connected between the common inputs of the phase shifters 9 and 10 an the switch 17 having two positions I and II, by which the zero phase shift indicator 16 can be connected to either the network containing the phase shifter 9 or the network containing the phase shifter 10.

The desired phase shift between the output voltages is set as follows: The main phase shifter 9 is set to zero on both the coarse and the fine dials. The phase shifter 9 is set to give a zero phase shift between the output voltages $V_1$ and $V_2$ The zero phase shift is then verified against the second zero phase shift indicator 16 which depends for its operation on multiple Lissajous FIGS. An advantage of this type of phase shift indicator is its single-channel construction, which excludes phase errors due to likely occurring discrepancies in phase between the channels. In position I, the frequencies are matched so that the Lissajous FIG. is reduced to a sinusoid by means of any phase shifter (omitted in the drawing) with an adjustment range of $\pm(360/2n)$, where $n$ is the frequency division factor. Then the switch 17 is put in position II, and the phase shifter 9 is trimmed to obtain a similar Lissajous FIG. In the meantime the zero phase shift indicator 15 continues to indicate a zero phase shift between the voltages $V_1$ and $V_2$. This is due to the fact that the sensitivity of the zero phase shift indicator 15 is of the order of 0.1° to 0.02°, so that the error at the output is 0.1° to 0.2°, which is reduced by the zero phase shift indicator 16 to a value somewhere between 0.02° and 0.03°. Next, the additional phase shifter, built into the phase-angle meter 8 and not shown here for clarity, is adjusted so that the reading device of the phase-angle meter 8 reads a value corresponding to the zero phase shift. Now the movable contact of the main phase shifter 9 is rotated and the sought phase shift between the output voltages $V_1$ and $V_2$ is taken from the reading device of the phase-angle meter and from the (coarse and fine) dials mounted on the phase shifter 10. In view of the high accuracy of the proposed phase calibrator (from a few tenths to a few hundredths of one degree), it is essential to provide for sufficiently continuous adjustment of the phase shift at the output of the precision phase calibrator. This is accomplished by provision of a reducer with a large gear ratio in the main phase shifter 10, on the one hand, and by provision of the frequency dividers 11 and 11', on the other.

The combination of a variable frequency signal in the range from 300 to 309.99999 kc. and the fixed 300-kc. signal in the mixers 12 and 12', and the division of the resultant signals in the frequency dividers 30 produced at the output of the phase calibrator two voltages in the frequency range from 0.01 c/s to 9.99999 (10) kc. in steps equal to the lowest value (0.01 c/s) of infrasonic frequency, remarkable for high frequency stability and with a phase adjustable from 0° to 360° in steps of a few hundredths of one degree.

Freedom of the mixers from errors is due to the fact that the signals fed to all inputs of—change "are coherent and" to—have coherent frequencies and are the mixers are coherent and highly stable in frequency.

While the invention has been illustrated and described in connection with a preferable embodiment, it is not intended to be limited to the details shown, since various modifications and adaptations may be made without departing in any way from the spirit and scope of the present invention, which will be readily comprehended by those skilled in the field.

Such modifications and adaptations should and are intended to be comprehended within the meaning and range of equivalence of the present invention as set forth in the appending claims.

What is claimed as new and desired to be secured by Letters Patent is:

We claim:

1. A precision phase calibrator comprising a master oscillator, a reference-phase network, a frequency divider in said reference-phase network, a variable-phase network, a frequency divider in said variable-phase network, and a phase shifter, the output of said phase shifter connected to the input of said frequency divider in the variable-phase network, the master oscillator connected to the input of said phase shifter, both of said networks being fed by said master oscillator, a phase-angle measuring circuit connected across said phase shifter and being provided with two mixers, one input of one of said two mixers being connected to the output of said phase shifter and one input of the other of said two mixers being connected to said master oscillator the other inputs of both of said mixers being fed with frequencies coherent with the frequency of said master oscillator, and a phase-angle meter connected to the outputs of said two mixers.

2. A calibrator as claimed in claim 1, wherein each of said reference-phase and variable-phase networks includes a mixer having one input and a second input, said one input connected to the output of the respective frequency divider, the second inputs of said mixers being fed by frequencies coherent with the frequency of said master oscillator.

3. A calibrator as claimed in claim 2, including a frequency box, said frequency box having an input and an output, said frequency box being provided with means for varying the frequency of a signal appearing at said output of said frequency box, said master oscillator connected to said input of said frequency box, said output of said frequency box connected to second inputs of each of said two mixers of said phase-angle measuring circuit and to second inputs of each of said mixers in said reference-phase and variable-phase networks.

UNITED STATES PATENT OFFICE
CERTIFICATE OF CORRECTION

Patent No. 3,588,694　　　　　　　　Dated June 28, 1971

Inventor(s) Svyatoslav Anatolievich Kravchenko et al

It is certified that error appears in the above-identified patent and that said Letters Patent are hereby corrected as shown below:

Column 1, line 58, after "networks" insert -- also contains a mixer --; column 2, line 53, "100" should read -- 1,000 --; same line, the symbol X, both occurrences, should be in ordinary type, not bold type; line 31, the numeral 1 in "1-Mc" should be in ordinary type, not bold type; column 4, lines 26-28 should read -- signals fed to all inputs of the mixers have coherent frequencies and are highly stable in frequency --; column 4, cancel lines 39-40.

Signed and sealed this 19th day of December 1972.

(SEAL)
Attest:

EDWARD M. FLETCHER, JR.　　　　　　　　ROBERT GOTTSCHALK
Attesting Officer　　　　　　　　　　　　Commissioner of Patents